United States Patent
Beckmann et al.

(10) Patent No.: US 7,215,941 B2
(45) Date of Patent: May 8, 2007

(54) EMERGENCY CALL SIGNALING VIA MOBILE TELECOMMUNICATIONS DEVICES

(75) Inventors: Mark Beckmann, Braunschweig (DE); Siegfried Bär, Unterschleissheim (DE); Hyung-Nam Choi, Hamburg (DE); Thomas Gottschalk, Berlin (DE); Martin Hans, Hildesheim (DE); Frank Kowalewski, Salzgitter (DE); Josef Laumen, Hildesheim (DE); Gunnar Schmidt, Wolfenbüttel (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 10/466,204

(22) PCT Filed: Jan. 4, 2002

(86) PCT No.: PCT/DE02/00013

§ 371 (c)(1),
(2), (4) Date: Jul. 14, 2003

(87) PCT Pub. No.: WO02/056624

PCT Pub. Date: Jul. 18, 2002

(65) Prior Publication Data

US 2004/0081139 A1   Apr. 29, 2004

(30) Foreign Application Priority Data

Jan. 12, 2001   (DE) ................... 101 01 282

(51) Int. Cl.
*H04M 11/04* (2006.01)
*H04Q 7/20* (2006.01)

(52) U.S. Cl. ............... 455/404.1; 455/404.2; 455/456.1

(58) Field of Classification Search ......... 455/404.1, 455/404.2, 404, 456.1
See application file for complete search history.

(56) References Cited

U.S. PATENT DOCUMENTS 5,388,147 A   2/1995   Grimes (Continued)

FOREIGN PATENT DOCUMENTS

DE   196 50 176   6/1997

(Continued)

OTHER PUBLICATIONS

XP-002209054—Digital cellular telecommunications system (Phase 2+) (GSM; Universal Mobile Telecommunications System (UMTS); Mobile radio interface layer 3 specification; Core Network Protocols—Stage 3.

(Continued)

*Primary Examiner*—William Trost
*Assistant Examiner*—Marivelisse Santiago-Cordero
(74) *Attorney, Agent, or Firm*—Bell, Boyd & Lloyd LLP

(57) ABSTRACT

To accelerate the specification of a location during the sending of an emergency call of a mobile telecommunications device (in particular, a terminal), the position of the respective mobile telecommunications device is determined prior to the sending of the call and/or independently of the mobile telecommunications network and is transmitted when the emergency call is sent.

7 Claims, 3 Drawing Sheets

U.S. PATENT DOCUMENTS

| | | | |
|---|---|---|---|
| 6,100,806 A | 8/2000 | Gaukel | |
| 2002/0006794 A1* | 1/2002 | Vialen et al. | 455/426 |
| 2002/0019241 A1* | 2/2002 | Vialen et al. | 455/458 |
| 2002/0086682 A1* | 7/2002 | Naghian | 455/456 |
| 2003/0148774 A1* | 8/2003 | Naghian et al. | 455/456 |
| 2004/0185870 A1* | 9/2004 | Matsuda | 455/456.1 |
| 2005/0090224 A1* | 4/2005 | Dorsey et al. | 455/404.1 |
| 2006/0121877 A1* | 6/2006 | Raghuram et al. | 455/404.2 |

FOREIGN PATENT DOCUMENTS

| | | |
|---|---|---|
| DE | 196 33 872 | 2/1998 |
| DE | 198 17 962 | 10/1999 |
| WO | WO 97/23104 | 6/1997 |

OTHER PUBLICATIONS

XP-002209055—Universal Mobile Telecommunications Sytem (UMTS); Stage 2 Functional Specification of Location Services in UTRAN.

3G TS 23.171 V3.2.0 (Dec. 2000); 3$^{rd}$ Generation Partnership Project; Technical Specification Group Services and System Aspects; Functional stage 2 description of location services in UMTS (release 1999).

3G TS 23.002 V3.4.0 (Dec. 2000); 3$^{rd}$ Generation Partnership Project; Technical Specification Group Services and System Aspects; Network architecture (release 1999).

3GPP TS 25.331 V3.5.0 (Dec. 2000); 3$^{rd}$ Generation Partnership Project; Technical Specification Group Radio Access Network; RRC Protocol Specification (release 1999) (600 pgs.) Complete document can be accessed at http://www.3gg.org/specs/numbering.htm.

* cited by examiner

FIG 3

Structure of an RRC Connection Setup Complete message according to the invention:

- Logical channel: DCCH
- Information direction: UE → UTRAN

| Information Element | Need | Multi | Type and reference | Semantics description |
|---|---|---|---|---|
| Message Type | MP | | Message Type | |
| UE information elements | | | | |
| Hyper frame number | MP | | Hyper frame number in [3], 10.3.3.13 | |
| UE radio access capability | MP | | UE radio access capability in [3], 10.3.3.41 | |
| UE Position Data | OP | | LCS Position in [3], 10.3.7.65 | |
| UE system specific capability | OP | | Inter-system message in [3], 10.3.8.6 | |

EMERGENCY CALL SIGNALING VIA MOBILE TELECOMMUNICATIONS DEVICES

BACKGROUND OF THE INVENTION

In mobile radio networks, the possibility of transmitting an emergency call automatically, in addition to the manual dialing of an emergency call number, has become increasingly established in the last several years. This service is referred to as "emergency call" and effects an automatic connection between a mobile telecommunications device and a so-called LCS client; in other words, for example, an emergency call center. For this purpose there can be provided, in motor vehicles for example, an accident sensor which, upon detecting an accident,—automatically (possibly after interrogating the reaction of the-driver) initiates the emergency call. At the same time it also must be possible to pinpoint the location of the vehicle if, for example, the driver is unconscious. For this purpose there is provided in, for example, the UMTS (Universal Mobile Telephone System) standard an interrogation procedure with the aid of which, when an emergency call is transmitted, it should be possible to locate the mobile telecommunications device even without any action on the part of the user.

Even apart from the emergency call there may be circumstances in which it is desirable to pinpoint the location of a mobile telecommunications device.

A method for transmitting an emergency call from a mobile radio subscriber device to an emergency call center in a PCS 1900 mobile radio system is known from WO 97/23104, wherein upon a request for emergency assistance (e.g. by entering an emergency call number such as "9-1-1"), position data of the mobile radio subscriber device may be transmitted.

An emergency call method in a cellular telecommunications system is known from U.S. Pat. No. 5,388,147, wherein position data of the calling mobile radio device is transmitted to an emergency call center only after setup of a digital transmission channel.

An object of the present invention is to enable the location of mobile telecommunications devices to be determined more quickly.

SUMMARY OF THE INVENTION

Accordingly, the present invention provides a method for sending an emergency call from a mobile telecommunications device in a UMTS mobile telecommunications network, wherein in a first step an RRC connection request for setting up an RRC connection is sent to a Serving Radio Network Controller, wherein in a second step, following successful detection of the request, the Serving Radio Network Controller returns an acknowledgement of the request via an RRC connection setup signal to the telecommunications device, wherein in a third step the telecommunications device confirms the established RRC connection to the Serving Radio Network Controller via an RRC connection complete message, wherein the current position of the respective mobile telecommunications device is determined prior to the transmission of the emergency call or during the transmission of the emergency call independently of further components of the telecommunications network and is transmitted with the RRC connection complete message already in the third step to the Serving Radio Network Controller, and wherein subsequently a direct connection is set up between the telecommunications device and a location service call client with the aid of a Mobile services Switching Center which is connected to the Serving Radio Network Controller.

Because the position of the respective subscriber device sending the emergency call is transmitted right at the start of the emergency call message, the time to execute the emergency call message is substantially reduced. The mobile subscriber device then does not have to wait for a position determination request.

The present invention also provides for a mobile telecommunications network having mobile telecommunications devices and having a Serving Radio Network Controller for performing the method according described above.

The fact that either the position of the mobile telecommunications device is already known before a possible emergency call is transmitted or is determined during the emergency call independently of other components of the mobile telecommunications network means that in the interrogation procedure of the emergency call the position of the mobile telecommunications device no longer needs to be determined via position finding using a number of transmitters of the device. The emergency call is therefore transmitted considerably faster and reliability is improved, since in the emergency situation there may be a poor connection between the mobile telecommunications device and other components, such as fixed transmitter installations, of the mobile telecommunications network. The method can be applied to any type of mobile telecommunications devices, such as terminal devices or even distributors in ships or road vehicles or to other telecommunications devices.

A particularly reliable position determination is made possible when this proceeds entirely without an action on the part of the particular user, such as when performed at regular time intervals. Then it is assured at all times that a position determination is present if a situation necessitating the transmission of an emergency call signal arises. This position determination should not lie too far back in the past, which means that narrow time intervals should be selected.

In order to be able to perform the position finding in advance in remote areas as well, this also can be done, for example, with the aid of further mobile telecommunications devices, and not just via fixed transmitter installations.

The position signal then can be transmitted with the emergency call message, once again without any intervention on the part of the user.

Determining a position without the use of further components of the mobile telecommunications network is possible, particularly via the Global Positioning System (GPS), from any mobile telecommunications device which is equipped with a suitable module.

Additional features and advantages of the present invention are described in, and will be apparent from, the following Detailed Description of the Invention and the Figures.

BRIEF DESCRIPTION OF THE FIGURES

FIG. 3 shows an execution schema for an emergency call in an embodiment according to the present invention.

DETAILED DESCRIPTION OF THE INVENTION

In a first exemplary embodiment, the position of the mobile telecommunications device UE is determined before transmission of an emergency call.

Figure 2:
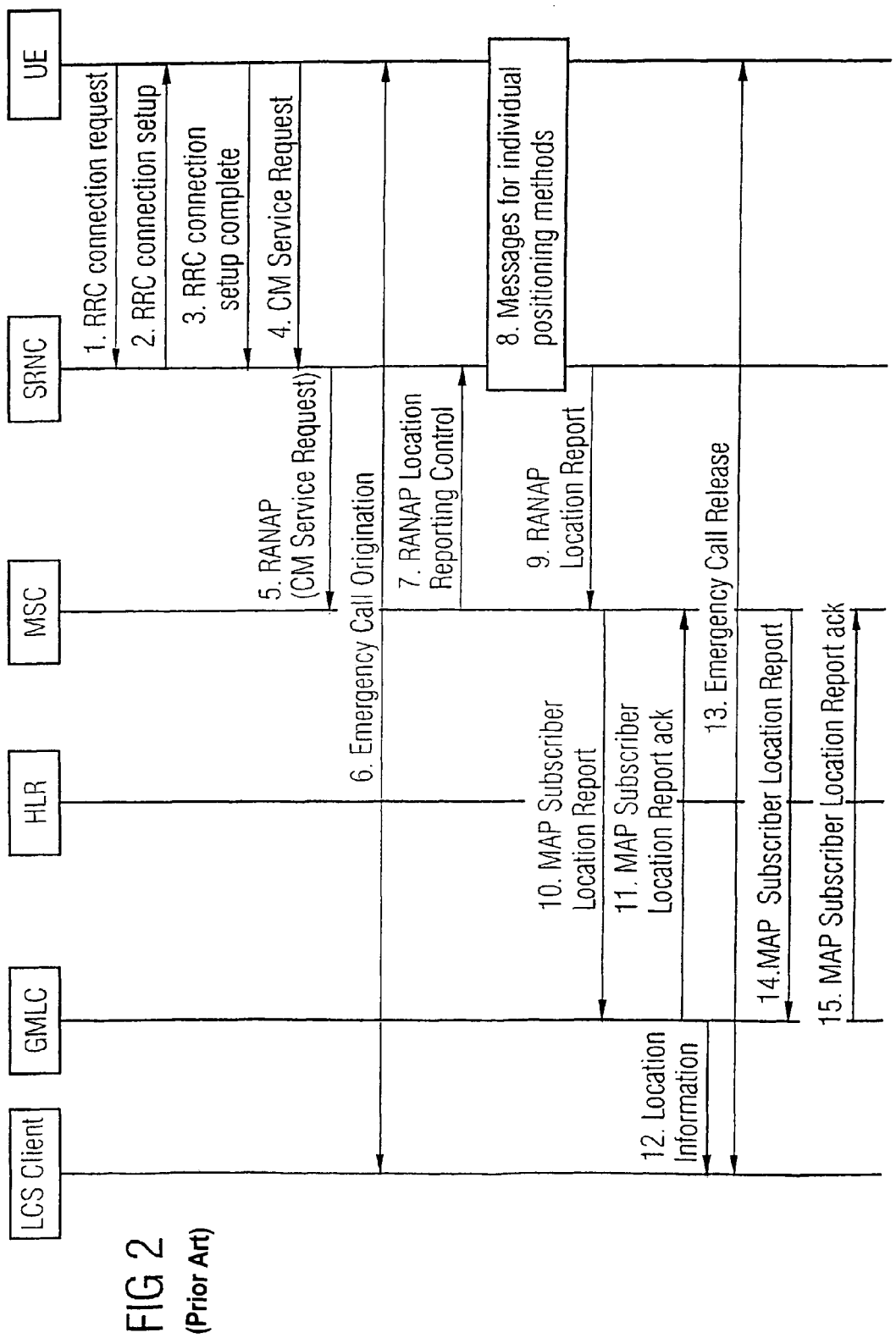
FIG. 2 shows a conventional execution log of an emergency call based on the UMTS standard.

By way of explanation, a previous execution log for an emergency call (indicated in FIG. 2 for the UMTS standard in the Release 99 development stage) is represented here as an example.

The emergency call is initiated by a request 1 by the mobile telecommunications device UE (User Equipment) which already contains the information that the request concerns an emergency call. This can take place, for example, as a result of a manual action on the part of a user or via an automated mechanism such as an accident detector.

In the initially executing first three steps, a connection is set up between the mobile telecommunications device UE and the control center SRNC (Serving Radio Network Controller) in accordance with the RRC (Radio Resource Control) protocol.

Figure 1:
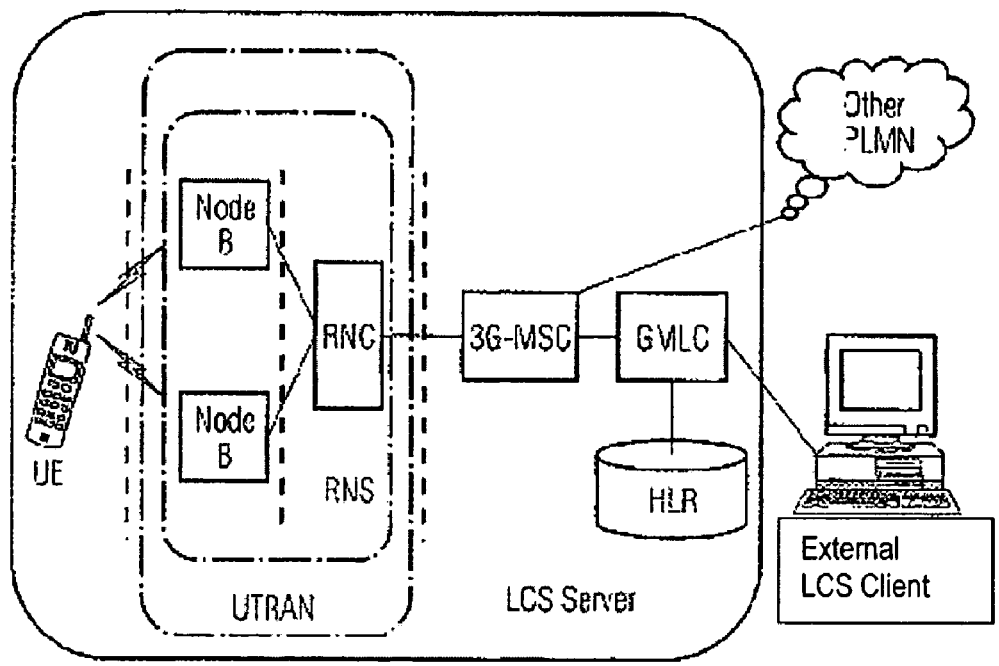
FIG. 1 shows a schematic representation of a position determination based on the UMTS standard.

Following setup of a connection (RRC connection request), request 1 is sent to a fixed control center SRNC (Serving Radio Network Controller) contained in the telecommunications network TN. This administers and controls a number of transmitter installations S1, S2, S3 . . . ., which are also referred to as Node B, and therefore also monitors a number of mobile radio cells. A unit consisting of one (S)RNC and a number of Nodes B is referred to as a Radio Network System (RNS), as shown in FIG. 1. Multiple RNS are combined in a UTRAN (Universal Terrestrial Radio Access Network).

Following successful detection of request 1, the acknowledgement of request 1 and the connection setup are returned by the control center SRNC to the requesting telecommunications device UE via a common signal 2 (RRC connection setup).

In the third step, this telecommunications device UE confirms the connection setup via message 3 (RRC connection complete) and the RRC connection between control center SRNC and mobile telecommunications device UE is thus established.

In the following two steps, the connection is then set up to the MSC (Mobile e-services Switching Center), which represents the interface between fixed network and mobile network. The abbreviation 3G-MSC used in FIG. 1 stands for an MSC of the third generation.

Via message 4 (CM Service Request) the mobile telecommunications device UE initially asks for a connection to the interface MSC, this request being addressed to the control center SRNC. The latter thereupon sends request 5 (RANAP CM Service Request) in accordance with the RANAP (Radio Access Network Application Part) protocol to the interface MSC. In the MSC, a check is also made to determine whether a localization of the mobile telecommunications device UE is actually permissible, whereas the component HLR (FIG. 1) checks whether the mobile telecommunications device UE actually supports the localization service.

In the sixth step, the connection is set up between the mobile telecommunications device UE on the one hand and the particular localization service center (LCS client) on the other; e.g., fire department, police, private security service, etc.

Up to this point, no determination of the location of the mobile telecommunications device UE of any kind has taken place, although much time has already elapsed as a result of the multi-step and relatively protracted connection setup between the mobile telecommunications device UE and the localization center (LCS client).

Only in the seventh step is signal 7 (RANAP Location Reporting Control) routed to the control center SRNC by the Mobile Service Switching Center MSC as a request that the mobile telecommunications device UE is to perform a position determination.

The actual determination of the position of the mobile telecommunications device UE takes place in the eighth step. This happens, for example, according to a propagation delay method in which various fixed transmitter installations S1, S2, S3 transmit data to the mobile telecommunications device UE and the distance between the UE and the transmitter installations S1, S2 and S3 is determined from the transit time of the respective data.

The position of the mobile telecommunications device UE determined in this way is then available for transmission and in the ninth step is sent via signal 9 (RANAP Location Report) to the interface between the mobile network and the fixed network; in other words, to the Mobile Service Center MSC.

In the next step of the time sequence, the MAP Subscriber Location Report is transferred as message 10 from the MSC to the so-called GMLC (Gateway Mobile Location Center). Among other information, this report contains an identification of the mobile telecommunications device UE as well as its position and the time that has elapsed since the last time its position was determined.

Signal 11 (MAP Subscriber Location ack) is returned to the MSC by the GMLC.

Following this, the information about the current position is transmitted as message 12 (Location Information) to the LCS client, such as the fire department or similar service, which was already prepared for the reception of the position indication as a result of the earlier message 8.

The current emergency call is terminated with the following message 13 "Emergency Call Release" of the location service client (LCS client) to the mobile telecommunications device UE and the system is released in preparation for a further emergency call.

Finally, messages 14 and 15 then administer the termination of the current emergency call between the GMLC and the service center MSC.

If, according to the present invention, on the other hand, the position of the UE is already known before the emergency service call is initiated by a mobile telecommunications device UE or by its user, the described procedure for the emergency call can be modified and thus considerably shortened as follows:

Already with message 3, the current position of the mobile telecommunications device UE is forwarded by the device to the control center SRNC for the transmitter installations S1, S2, S3. This then relays the position directly to the location service call (LCS) client, such as the fire department. The mobile telecommunications device UE then does not have to wait for a position determination request. The structure of message 3 (RRC Connection Setup Complete) for the embodiment according to the present invention is shown in FIG. 3. It becomes clear that the position data is then already included here.

The position determination in advance can be performed, for example, at regular time intervals according to one of the following methods:

In a first method, a fixed transmitter installation S1, such as a transmission mast, within range of which the telecommunications device UE whose position is to be determined is located, transmits a signal (so-called cell ID) identifying the particular cell in which the transmitter installation is located. As a result of this signal being received by a mobile telecommunications device located in the cell, the position of the device in the cell, in other words within the reception range of the transmitter installation, is determined. Due to the extensive coverage of such a cell, however, the determination of the position is limited in terms of its accuracy.

In a mode used particularly in the East Asia region and operating at a data transfer rate reduced to approximately 1.28 Mchips/s compared with a TDD mode operating at a typical data transfer rate of 3.84 Mchips/s, the mode being called the TD-SCDMA (Time Division Synchronous Code Division Multiple Access) mode, a further position determination method is used which employs directional signal transmission and can calculate the position of the mobile telecommunications device UE by measuring a propagation delay of a signal between a transmitter installation and a mobile telecommunications device UE while at the same time determining the transmission direction. In this case, the transmission direction is determined via so-called smart antennas which permit directional transmission and reception of data. These smart antennas must be provided both in fixed transmitter installations and in mobile telecommunications devices UE.

In a further advantageous method, the transmitter installations transmit data in specific blocks, where certain blocks are only occasionally filled with data, such as synchronization data, and at times remain free as windows. In these window phases (idle timeslots), the mobile telecommunications device UE does not need to receive any signals from the transmitter installation S1. The interval therefore can be used by the mobile telecommunications device UE to receive signals from other transmitter installations S2, S3. Accordingly, a mobile telecommunications device UE can receive position signals P2, P3 from other transmitter installations S2, S3 during these intervals and thus can be located simultaneously by a number of transmitter installations S1, S2, S3. The other transmitter installations S2, S3 transmit the same signal sequences as the transmitter installation S1. Thus, a timeslot of the transmitter installation S2 or S3 begins at the same time as this timeslot in the signal transmitted by the transmitter installation S1. Whenever a window rains in the corresponding timeslot in the signal sequence transmitted by S1, the corresponding signal contained in the same named timeslot of the transmitter installation S2 or S3 can be received. These transmitter installations also do not fill the timeslot with a signal in each transmission, but leave it free as an idle slot in regular or irregular, albeit varying, sequences in order to be able to receive signals from other transmitter installations.

The mobile telecommunications device UE evaluates the receive times of the signals of the respective timeslot of further transmitter installations (e.g., S2, S3) which are received in the respective open timeslot of a transmitter installation (e.g., S1). As a result, the mobile telecommunications device UE determines the time difference $\Delta t1$ between the beginning of the timeslot and the receive time of the signal of the transmitter installation S1 belonging in this timeslot. It notifies this value to the transmitter installation S1. In the same way, the time difference $\Delta t2$ between the beginning of the timeslot and the receipt of the associated signal of the transmitter installation S2 is determined during an interval of the transmitter installation S1 and reported to the latter. Similarly, the time difference $\Delta t3$ between the beginning of the timeslot and the reception of the corresponding signal of the transmitter installation S3 is determined and reported to the transmitter installation S1.

Figure 4:
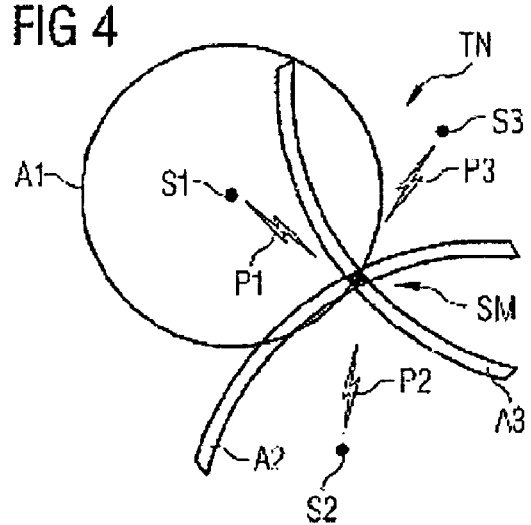
FIG. 4 shows a schematic representation of a position determination method in a plan view onto multiple fixed transmitter installations and a mobile telecommunications device.

The values of the signal delays determined in this way are used by the transmitter installation S1 to calculate the exact position of the mobile telecommunications device UE. Toward that end, the differences $\Delta t12=\Delta t1-\Delta t2$ and $\Delta t13=\Delta t1-\Delta t3$ are formed respectively. From this, the position of the mobile telecommunications device UE can be determined as the point of intersection of hyperbolas A2 and A3 (FIG. 4). Their shapes result from the known positions of the transmitter installations S2 and S3 as well as from the time differences $\Delta t12$ and $\Delta t13$.

Assuming the signal propagation speed is known, the distance of the mobile telecommunications device UE from the transmitter installation S1 is known from the signal propagation delay $\Delta t1$. Therefore, the position of the mobile telecommunications device can be determined from the intersection SM of the distance circle A1 around the transmitter installation S1 as well as the time difference hyperbolas A2 and A3 (FIG. 4). The intersection SM indicates the position of the mobile telecommunications device UE.

As a result of the fact that the position is known and is transmitted right at the start of the emergency call message, the time taken to execute the emergency call message is substantially reduced.

In a second exemplary embodiment, the position is determined during the emergency call transmission, albeit in a method that is independent of further components of the mobile telecommunications network TN. For this, the GPS (Global Positioning System) is used to determine the position. In this way, an accuracy to within approximately 20 m can be achieved. The mobile telecommunications device UE must be provided with a GPS unit, although this then enables it to perform its position determination much faster and independently of the mobile telecommunications network TN; for example, even when there is poor reception of signals from the transmitter installations S1, S2, S3 . . . .

Sending the emergency call therefore can be performed faster even when the GPS is used during the sending of the emergency call. It is understood that position determination using the GPS also can be performed in advance according to a regular timing pattern and the position data then can be stored and made available for use in an emergency call.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting a current position of a mobile telecommunications device in an emergency call from the mobile telecommunications device to a location service client, the method comprising the steps of:
   sending a Radio Resource Control connection request message from the mobile telecommunications device to a serving radio network controller of a mobile telecommunications network for requesting setup of a Radio Resource Control connection, the Radio Resource Control connection request containing information indicating that the request concerns an emergency call;
   returning an acknowledgement of the Radio Resource Control connection request by transmitting a Radio Resource Control connection setup message from the serving radio network controller to the telecommunications device following successful detection of the Radio Resource Control connection request message at the serving radio network controller;

confirming, via the telecommunications device, an established Radio Resource Control connection to the serving radio network controller by sending an Radio Resource Control setup connection setup complete message with the Radio Resource Control connection setup complete message including the current position of the mobile telecommunications device determined by the respective mobile telecommunications device; and directly relaying the current position of the mobile communications device from the serving radio network controller to the location service client.

2. A method for transmitting an emergency call from a mobile telecommunications device as claimed in claim 1, wherein the current position is determined independently of a user of the mobile telecommunications device at regular intervals.

3. A method for transmitting an emergency call from a mobile telecommunications device as claimed in claim 1, wherein the mobile telecommunications device determines the current position by using GPS.

4. A method for transmitting an emergency call from a mobile telecommunications device as claimed in claim 1, wherein the current position is determined via a propagation delay method.

5. A method for transmitting an emergency call from a mobile telecommunications device as claimed in claim 4, wherein propagation delays of signals of different fixed transmitters are determined in idle periods of at least one other transmitter.

6. A method for transmitting an emergency call from a mobile telecommunications device as claimed in claim 4, wherein propagation delays of signals of further mobile telecommunications devices which, in their turn, regularly perform a separate position determination are used for position determination.

7. A mobile telecommunications network for transmitting a current position of a mobile telecommunications device in an emergency call from the mobile telecommunications device to a location service client, comprising:

at least one mobile telecommunications device; and a serving radio network controller, wherein an Radio Resource Control connection request is sent from the mobile communications device to the serving radio network controller for requesting a setup of an Radio Resource Control connection, the Radio Resource Control connection request containing information indicating that the request concerns an emergency call, wherein the serving radio network controller returns an acknowledgment of the Radio Resource Control connection request with an Radio Resource Control connection setup message to the mobile telecommunications device after successfully detecting the Radio Resource Control connection request, and wherein the mobile telecommunications device confirms the established Radio Resource Control connection to the serving radio network controller by sending a Radio Resource Control connection setup complete message that includes the current position of the mobile telecommunications device determined by the respective mobile telecommunications device;

wherein the current position of the mobile telecommunications device is directly relayed from the serving radio network controller to the location service client.

* * * * *